US012614561B1

(12) United States Patent
Lee et al.

(10) Patent No.: US 12,614,561 B1
(45) Date of Patent: Apr. 28, 2026

(54) ENERGY-ASSISTED RECORDING NEAR-FIELD TRANSDUCER WITH INLAY TO IMPROVE COUPLING EFFICIENCY

(71) Applicant: SEAGATE TECHNOLOGY LLC, Fremont, CA (US)

(72) Inventors: Tae-Woo Lee, Eden Prairie, MN (US); David Michael Grundman, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/789,824

(22) Filed: Jul. 31, 2024

(51) Int. Cl.
  *G11B 5/31* (2006.01)
  *G11B 5/012* (2006.01)
  *G11B 13/08* (2006.01)

(52) U.S. Cl.
  CPC ............ *G11B 5/3116* (2013.01); *G11B 5/012* (2013.01); *G11B 13/08* (2013.01)

(58) Field of Classification Search
  None
  See application file for complete search history.

(56) References Cited

U.S. PATENT DOCUMENTS

| | | | |
|---|---|---|---|
| 8,514,673 B1 | 8/2013 | Zhao | |
| 8,619,513 B1 * | 12/2013 | Challener | ............ G11B 5/3116 |
| | | | 369/13.33 |

| | | | |
|---|---|---|---|
| 9,019,803 B1 | 4/2015 | Jin | |
| 9,728,209 B2 * | 8/2017 | Chen | ...................... G11B 5/314 |
| 9,741,377 B1 * | 8/2017 | Sasaki | .................. G11B 5/6088 |
| 9,972,346 B2 | 5/2018 | Blaber | |
| 10,121,496 B1 * | 11/2018 | Peng | ................... G11B 5/4866 |
| 10,229,704 B2 * | 3/2019 | Blaber | ................. G11B 5/314 |
| 10,403,315 B2 | 9/2019 | Matsumoto | |
| 10,490,221 B1 * | 11/2019 | Chen | ...................... G11B 13/08 |
| 10,832,717 B1 * | 11/2020 | Cheng | ................. G11B 5/3136 |
| 11,532,329 B1 * | 12/2022 | Matsumoto | .......... G11B 5/1875 |
| 11,657,844 B1 * | 5/2023 | Lee | ...................... G11B 5/7375 |
| | | | 360/59 |
| 11,790,944 B2 * | 10/2023 | Cheng | ................. G11B 5/6088 |
| | | | 369/13.33 |
| 11,900,963 B2 * | 2/2024 | Cheng | ................. G11B 5/4866 |
| 12,354,628 B1 * | 7/2025 | Xu | ......................... G11B 5/314 |
| 2015/0003218 A1 | 1/2015 | Peng | |
| 2016/0351211 A1 * | 12/2016 | Blaber | ............... G11B 5/6082 |
| 2019/0057717 A1 * | 2/2019 | Chen | ...................... G11B 5/314 |
| 2022/0415354 A1 * | 12/2022 | Cheng | .................... G11B 5/314 |

* cited by examiner

*Primary Examiner* — William J Klimowicz

(74) *Attorney, Agent, or Firm* — Mueting Raasch Group

(57) ABSTRACT

A recording head has a write pole with a pole tip extending to a media-facing surface of the recording head. A peg coupler is located on a substrate-parallel surface of the pole tip and extending to the media facing surface. A near-field transducer is proximate the media-facing surface and includes a plate-like, enlarged part with a peg extending from the enlarged part towards the media-facing surface. The peg separated is separated in a downtrack direction from the peg coupler by a coupling gap. The enlarged part has a coupling surface facing the write pole, and includes an inlay on or near the coupling surface and spaced away from the peg. The inlay extends at least partially through a thickness of the enlarged part in the downtrack direction and extends between opposing crosstrack edges of the enlarged part.

16 Claims, 11 Drawing Sheets

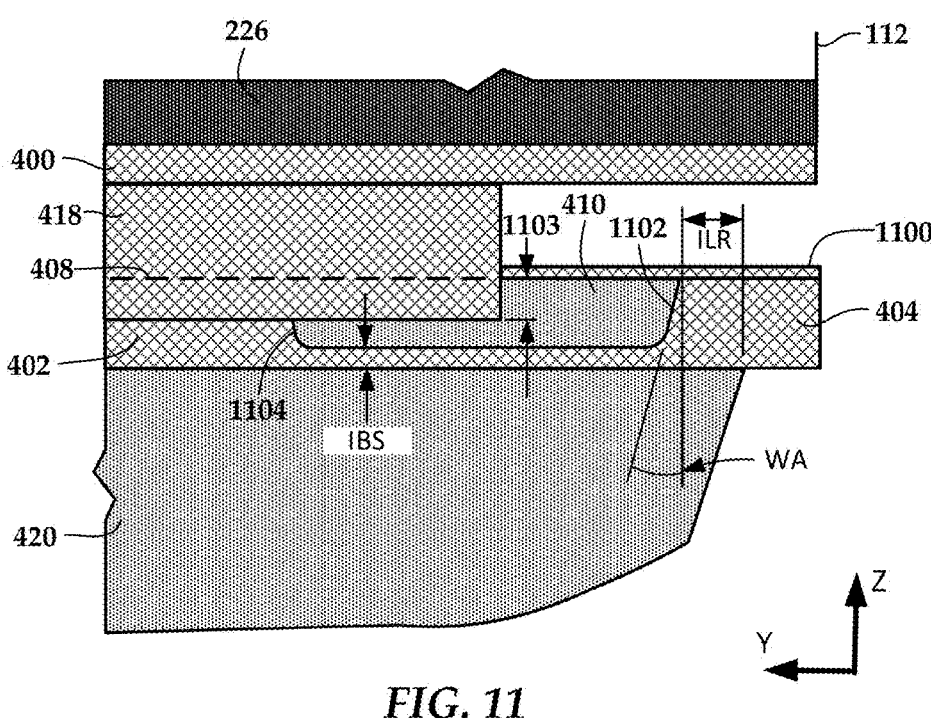
FIG. 11
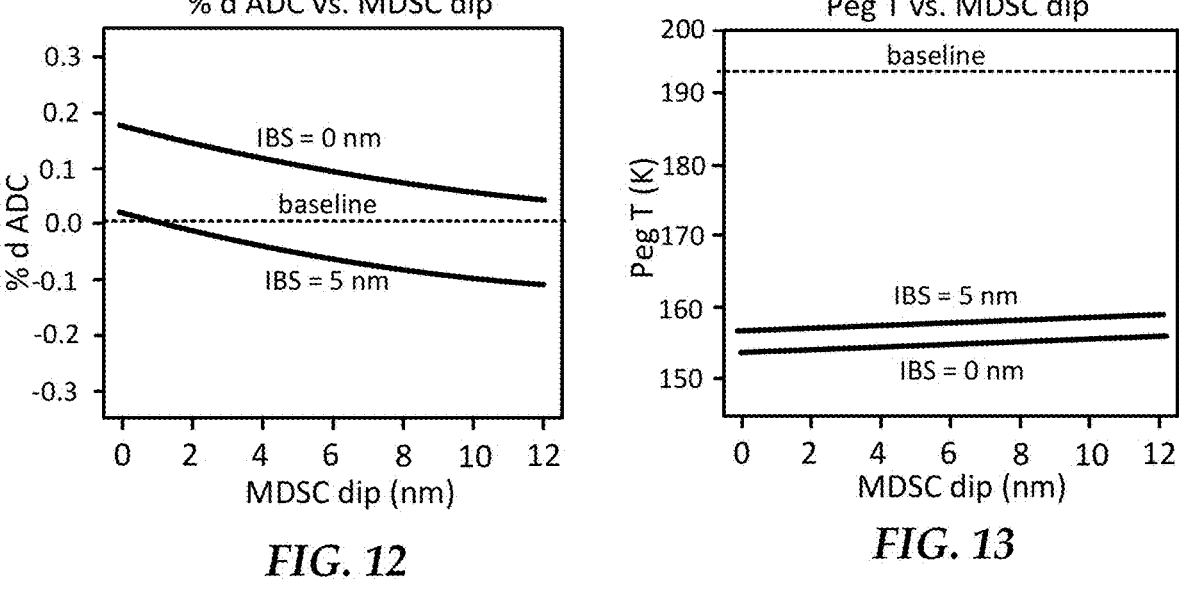
FIG. 12          FIG. 13

ENERGY-ASSISTED RECORDING NEAR-FIELD TRANSDUCER WITH INLAY TO IMPROVE COUPLING EFFICIENCY

SUMMARY

The present disclosure is directed to an energy-assisted recording near-field transducer with an inlay to improve coupling efficiency. In one embodiment, a recording head includes a write pole having a pole tip extending to a media-facing surface of the recording head and a peg coupler on a substrate-parallel surface of the pole tip and extending to the media-facing surface. The recording head includes a near-field transducer proximate the media-facing surface. The near-field transducer has a plate-like, enlarged part with a peg extending from the enlarged part towards the media-facing surface. The peg is separated in a downtrack direction from the peg coupler by a coupling gap. The enlarged part has a coupling surface facing the write pole. The enlarged part has an inlay on or near the coupling surface and spaced away from the peg. The inlay extends at least partially through a thickness of the enlarged part in the downtrack direction and extends between opposing cross-track edges of the enlarged part. The inlay is formed of a first material having higher optical coupling efficiency than a second material used to form the enlarged part.

In another embodiment, the recording head also includes a middle disc disposed between the enlarged part and the peg coupler. The middle disc partially covers the inlay, and may be formed of the second material.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIG. 11 is a side cutaway view showing details of a near-field transducer according to another embodiment;

FIGS. 12-15 are graphs showing simulation performance of an NFT according to various embodiments;

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

A HAMR write transducer described below uses a plate-type NFT with an enlarged part that collects optical energy being directed on it by adjacent reflectors. The NFT is shaped with a peg directed toward the recording medium. Energy in the form of surface plasmons funnels to the peg where it is shaped and directed to heat the recording medium. The NFT may have other features such as heat sinks, sunken plates, etc., which helps ensure desired performance and longevity of the NFT.

One way to increase areal density capacity (ADC) for disk storage is to decrease the size of the optical hotspot on the media. One approach to reducing hotspot size is reducing the crosstrack dimension of the peg part of the NFT. While forming a peg that meets the target size (e.g., less than 40 nm, less than 20 nm, etc.) is within process capabilities, such small structures may have an issue from a reliability standpoint. For example, the high concentration of energy causes significant heating at the peg, and this heating can degrade the peg over time, as well as surrounding materials.

In embodiments described below, an NFT design is described that can boost ADC without adding to head temperature. This can increase the reliability of the NFT while still achieving performance goals. Generally this involves forming an inlay in the enlarged part of the NFT that has superior optical properties compared to surrounding materials. The peg and a media-facing part of the NFT are formed of a more thermally robust material that performs better in the high thermal stress environment proximate the air bearing surface (ABS) of the head. By carefully choosing the materials and geometry of the inlay, the NFT can still provide a small hotspot with high thermal gradient, while keeping the NFT peg at manageable temperatures.

Figures 1, 2:
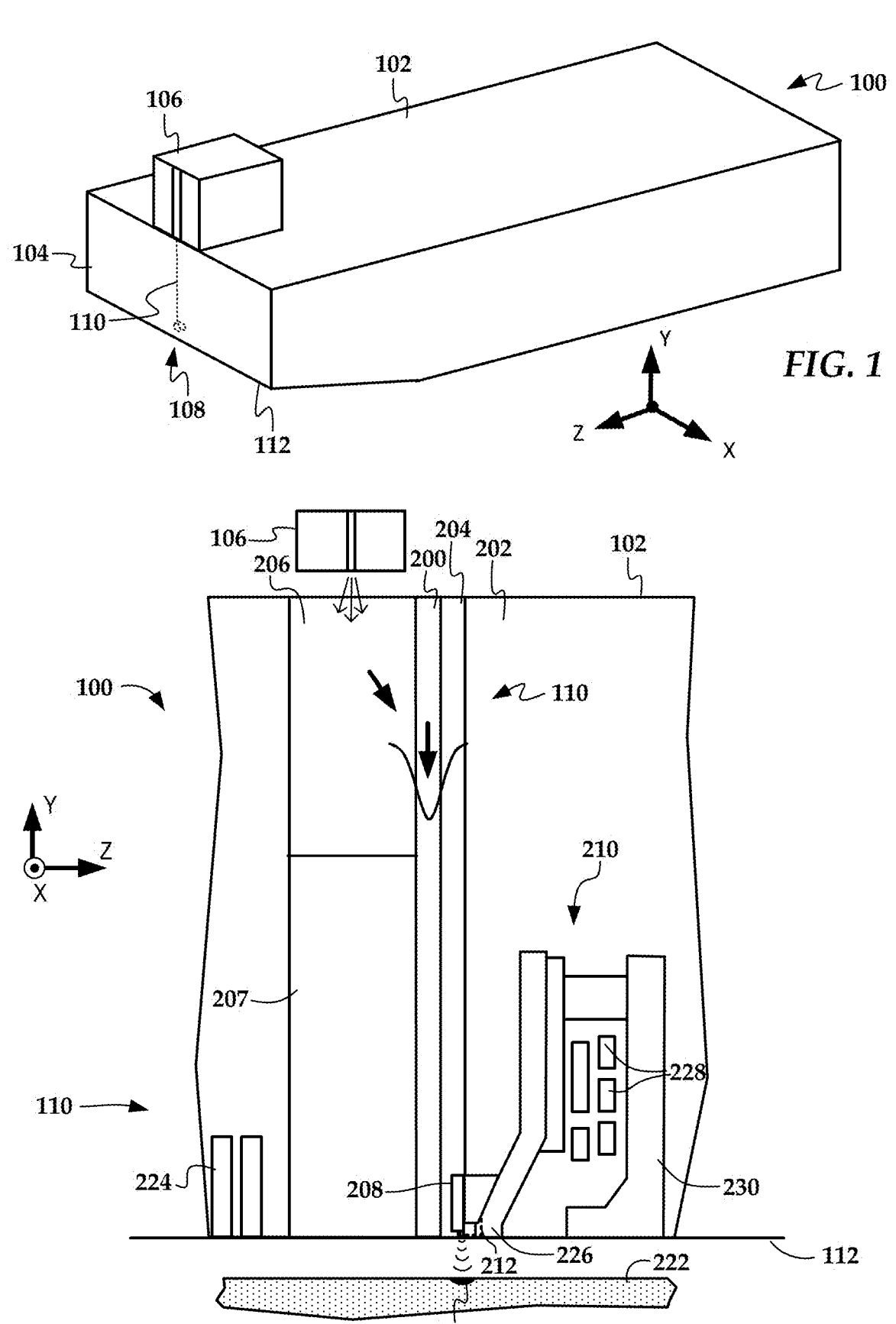
FIG. 1 is a perspective view of a slider assembly according to an example embodiment.
FIG. 2 is a cross-sectional view of a slider along a down-track plane according to according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, and recording head. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 3:
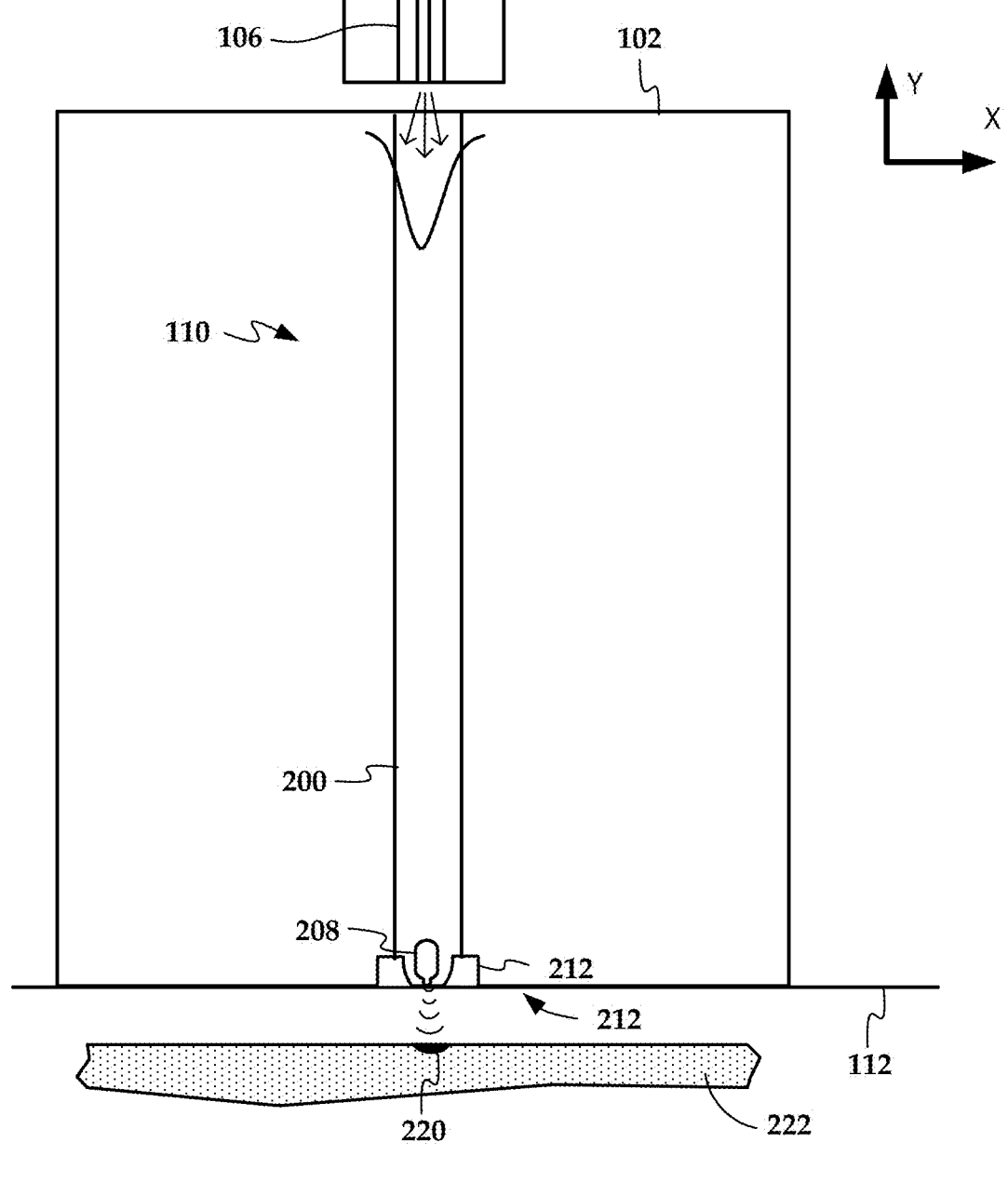
FIG. 3 is a wafer plane view of a slider according to an example embodiment.

In FIGS. 2 and 3, respective cross-sectional and wafer plane views of the slider body 102 show a light delivery system according to an example embodiment. The slider body includes an NFT 208, a magnetic writer 210 and an optional mirror assembly 212, sometimes referred to as a subwavelength mirrors, subwavelength focusing mirrors, subwavelength solid immersion mirrors (SIMs), mini-SIMs, mSIMs, etc. Light, emitted from the laser diode 106, is coupled into a channel waveguide 110 by a waveguide input coupler 206, which directs the light to a waveguide core 200. The input coupler 206 is replaced by a bottom cladding layer 207 towards the media-facing surface 112. Note that other waveguide and input coupler arrangements may be used with the NFT 208.

The NFT 208 has an enlarged part with two curved ends (also referred to as a stadium shape) and a protruded peg. Other shapes may be possible for the enlarged part of the NFT 208, e.g., circular, ovular, rectangular, triangular. The NFT 208 is placed proximate a side cladding layer 204 and top cladding layer 202 of the waveguide 110 and near the waveguide core 200. The NFT 208 could be also placed into the waveguide core 200. The NFT 208 achieves plasmonic resonance in response to the light coupled via the waveguide 110 and creates a small hotspot 220 on a surface of a recording medium 222 (e.g., magnetic disk) during recording.

The NFT 208 is proximate a write pole 226 of the writer 210. The writer 210 includes coils 228 that induce a magnetic flux through the write pole 226. A magnetic flux path is created between the write pole 226 and a return pole 230 of the writer 210. There may be more than one return pole, e.g., on a side of the NFT 208 facing the reader 224.

A magnetic reader 224 is shown down-track from the NFT 208 and magnetic writer 210. The magnetic reader 224 may include a magneto-resistive stack that changes resistance in response to changes in magnetic field detected from the recording medium 222. These changes in magnetic field are converted to data by a read channel of an apparatus that houses the head 100 and recording medium 222 (e.g., hard disk assembly).

Figures 4, 5:
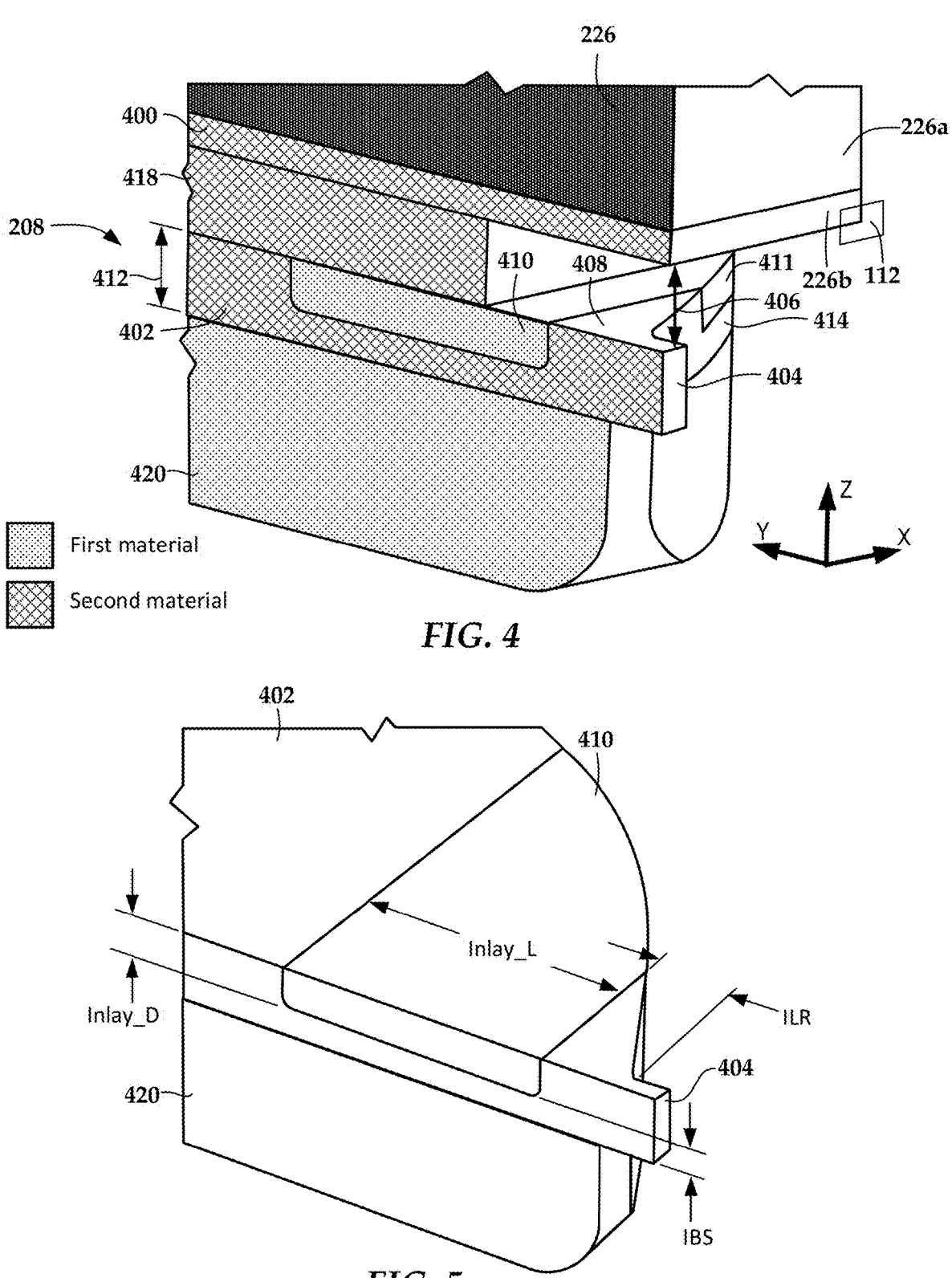
FIG. 4 is a perspective cutaway view of a near-field transducer according to an example embodiment.
FIG. 5 is a cutaway view showing various dimensions of a near-field transducer according to various embodiments.

In FIG. 4, a cross-sectional perspective view shows a near-field transducer 208 according to an example embodiment. The near-field transducer 208 is located proximate a pole tip 226a of the write pole 226. The pole tip 226a extends to the media-facing surface 112 of the recording head. A peg coupler 400 is disposed on a substrate-parallel surface 226b of the pole tip 226 and extends to the media facing surface 112. The peg coupler 400 is formed of a plasmonic metal with robust characteristics, such as Rh or Ir. During recording, the peg coupler 400 interacts with a peg 404 of the near-field transducer 208 to direct surface plasmons to the recording medium.

The near-field transducer includes a plate-like, enlarged part 402, sometimes referred to as a bottom disc (BDSC). The peg 404 extends from the enlarged part 402 towards the media-facing surface 112. The peg 404 is separated in a downtrack direction (z-direction) from the peg coupler 400 by a coupling gap 406. The coupling gap 406, as well as the space surrounding other components seen in this figure, will typically be filled with a dielectric such as $Al_2O_3$ or $SiO_2$.

The enlarged part 402 has a coupling surface facing the write pole 226. An inlay 410 is on or near the coupling surface 408 and spaced away from the peg 404. The inlay 410 extends at least partially through a thickness 412 of the enlarged part in the downtrack direction and extends between opposing crosstrack edges of the enlarged part 402. This figure is a cutaway view down the center of the near-field transducer 208, so only one of the crosstrack edges 414 of the enlarged part 402 is seen in this view. A cross track edge 411 of the inlay 410 is exposed and conforms to the shape of the crosstrack edge 414 of the enlarged part 402 on both sides.

The inlay 410 is formed of a first material having higher optical coupling efficiency than a second material used to form the enlarged part 402. The second material will generally be more mechanically and/or thermally robust than the first material. For example, the first material may include Au, Al, Cu, Ag or alloys thereof, and the second material may include Ir, Rh, Pd, Pt, Os or alloys thereof. The first and second materials are indicated by different hatching, and this convention is maintained in other cross-sectional views that follow FIG. 4. Other components not part of the near-field transducer 208 are shown being made from the first and second materials as well, e.g., the peg coupler 400 is shown formed from the second material. Those other components can be made of different materials than the first and second materials in some embodiments, although generally with the same physical properties such as high coupling efficiency or mechanical robustness.

Also seen in this figure is a middle disc (MDSC) 418 disposed between the enlarged part 402 and the peg coupler 400. The middle disc 418 is formed of the second material in this example, and is also shown as partially covering the inlay 410. Generally, the middle disc 418 helps heat sink the near-field transducer 208, e.g., draw heat towards the write pole 226. The middle disc 418 is recessed from the media-facing surface 112 so as not to interfere with the peg coupling.

A sunken disc (SDSC) 420 (also sometimes referred to as a "bottom disc") is located on a surface of the enlarged part 402 that faces away from the write pole 226. The sunken disc 420 is shown formed of the first material used in the inlay 410, although may also be formed of a different material. Generally, the different recessions of the sunken disc 420 and the middle disc 418 from the media facing surface can be selected to optimize performance of the near-field transducer 208 and the write pole 226.

Figure 6:
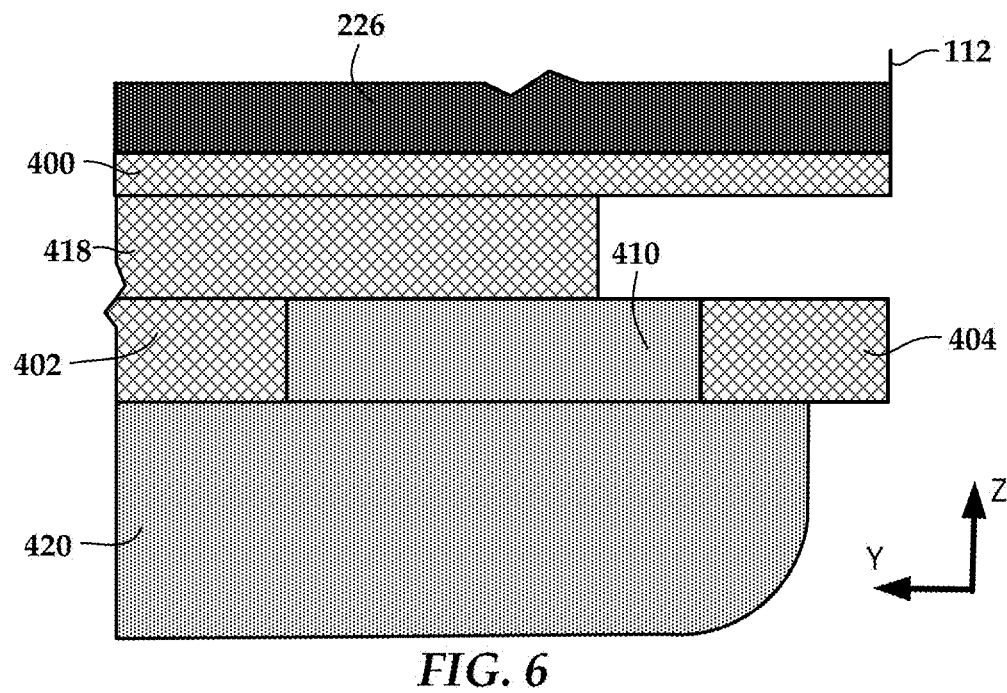
FIG. 6 is a side cutaway view showing details of a near-field transducer according to another embodiment.

In FIG. 5, a cutaway view of the near-field transducer 208 shows various dimensions that are used to describe the geometry of the inlay 410. The Inlay_D and Inlay_L variables are the respective depth and length of the inlay 410. The variable ILR is recess of the inlay 410 from the end of the enlarged part 402. The end of the enlarged part 402 is located at the intersection between the enlarged part 402 and the peg 404. The variable IBS defines spacing between the inlay 410 and the sunken disc 420. In some embodiments, such as shown in the cross-sectional view of FIG. 6, the value of IBS may be zero. In embodiments with IBS=0, the inlay 410 is in contact with the sunken disc 420.

Figure 7:
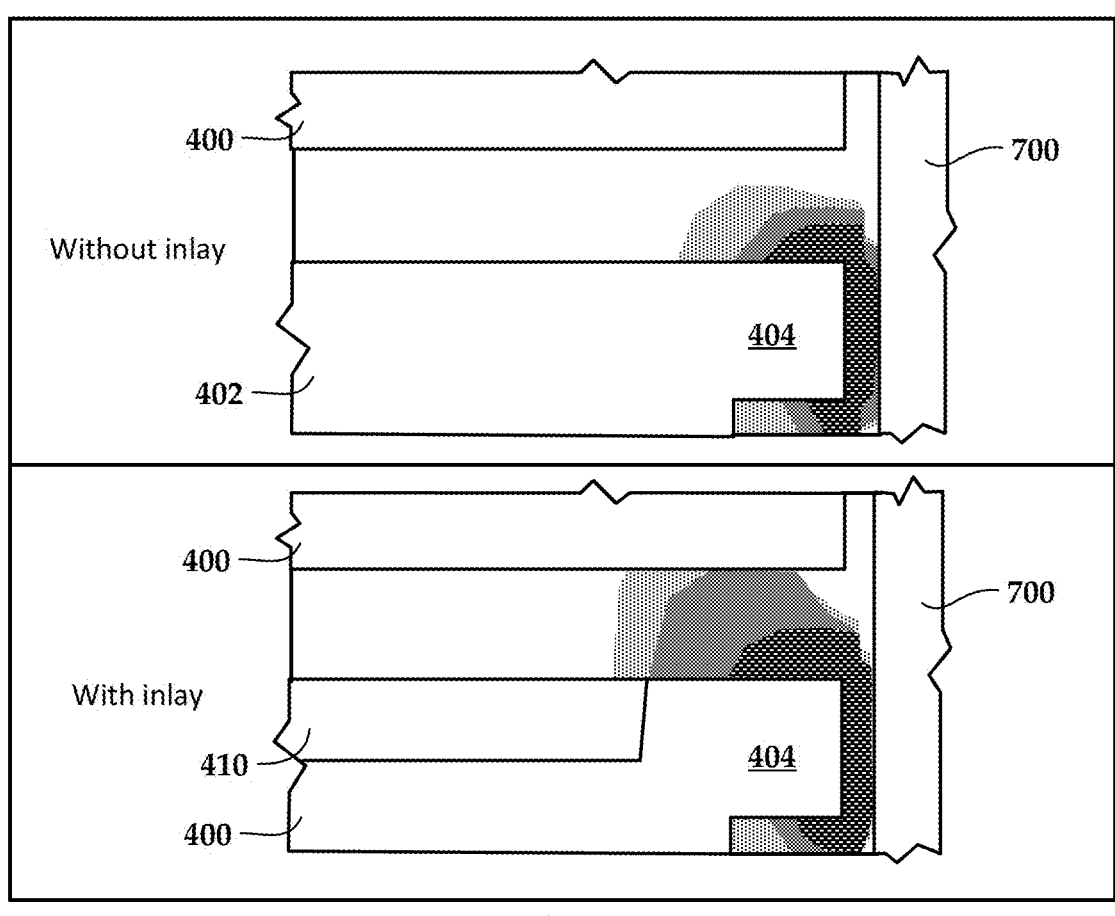
FIG. 7 is a set of plots comparing electric field intensity for simulations of a near-field transducer with and without an inlay according to an embodiment.

In FIG. 7, two plots show simulation results for electric field (E-field) for a near-field transducer according to an embodiment. The top plot shows field intensity (darker shading indicating higher intensity) at the peg 404 without an inlay, and the bottom plot shows the same design and conditions (e.g., same laser power input) as the top plot, but with the inlay 410. The recording medium 700 was included as part of the simulation. These plots indicate the inlay increases E-field intensity between the peg coupler 400 and the peg 404.

Figure 8:
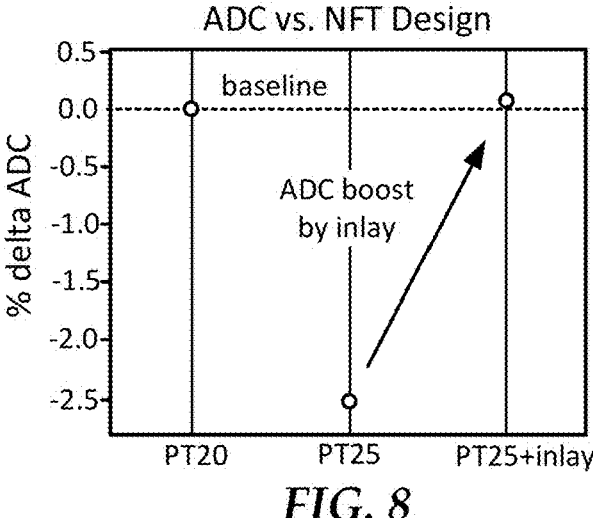
FIGS. 8-10 are graphs showing changes in simulation performance with and without an inlay according to various embodiments.
Figure 9:
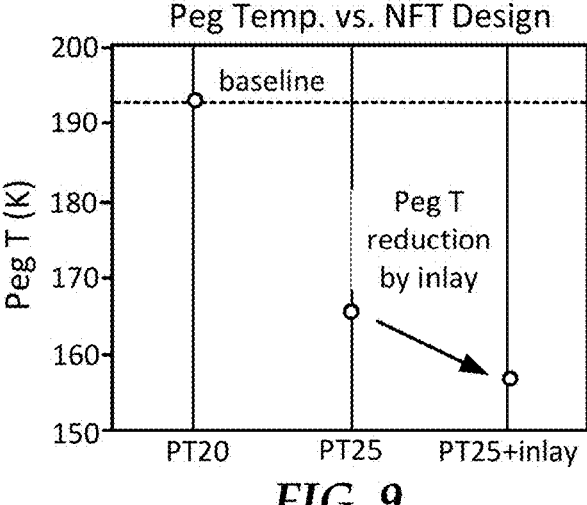
Figure 10:
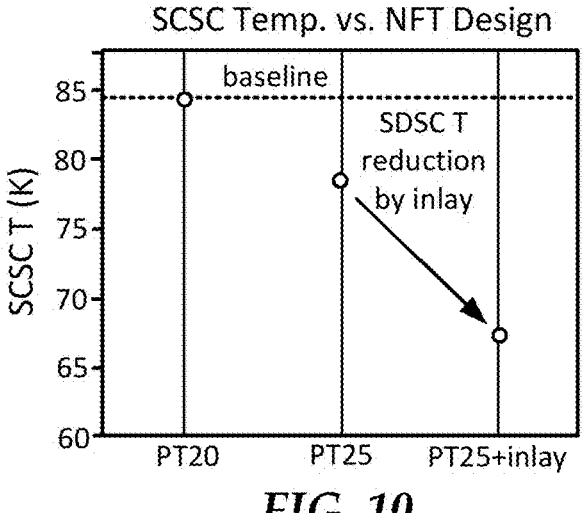

In FIGS. 8-10, plots show simulated performance changes for a near-field transducer according to various embodiments. The PT20 design indicates an existing implementation (baseline) with a peg thickness of 20 nm. The PT25 and PT25+inlay designs indicate peg thickness of 25 nm, without and with an inlay, respectively. In all cases, the peg width is 25 nm. Tables 1 and 2 below provide numerical results of these simulations. The following are the meanings of acronyms in the tables that are not described elsewhere herein: PCS: peg-to-coupler spacing; CPI: optical writing power; WPE: write-plus-erasure track width; DTTG: downtrack thermal gradient; Pabs: light absorption in the head. Note that all of the Kelvin temperatures in this and other tables represent a temperature rise over ambient, not absolute temperature.

TABLE 1

| Design | Peg dim. (nm) | PCS (nm) | ADC gain | Peg T (K) | SDSC T(K) |
|---|---|---|---|---|---|
| Baseline | PW25/PT20 | 25 | ref | 193 | 64 |
| With Inlay | PW25/PT25 | 20 | 0% | 157 (−35) | 67 (−17) |

TABLE 2

| Design | Inlay T (K) | WPE (nm) | DTTG (K/nm) | CPI (mW) | Pabs (mW) |
|---|---|---|---|---|---|
| Baseline | — | 26.21 | 10 | 3.06 | 1.76 |
| With Inlay | 62 | 26.14 | 10 | 2.63 | 1.48 |

In FIG. 11, a cross-sectional side view shows details of a near-field transducer according to other embodiments. In this example, a cap 1100 is formed over the inlay 410. The cap 1100 is formed of the same material (e.g., the second material such as Rh or Ir) as the enlarged part 402 and peg 404. This example also shows the middle disc 418 extending through the coupling surface 408 of the enlarged part 402, which is referred to as a "MDSC dip" and indicated by reference numeral 1103 in the figure. The middle disc 418 is sunken within the enlarged part 402 and the inlay 410. This may also result in the middle disc 418 extending into the inlay 410 in the downtrack direction (negative z-direction) as well as into the enlarged part 402. The MDSC dip is a natural result of the manufacturing process, but has been found to have no meaningful impact on performance in the current analyses.

Also seen in this figure, media-facing-surface parallel edges 1102, 1104 of the inlay 410 have a non-zero wall angle (WA) relative to the media-facing surface 112. This may be a natural result of the manufacturing process (e.g., ion-beam etching, chemical etching) used to form a trench for the inlay 410 within the enlarged part 402, and can typically be controlled through process selection and settings.

Figure 14:
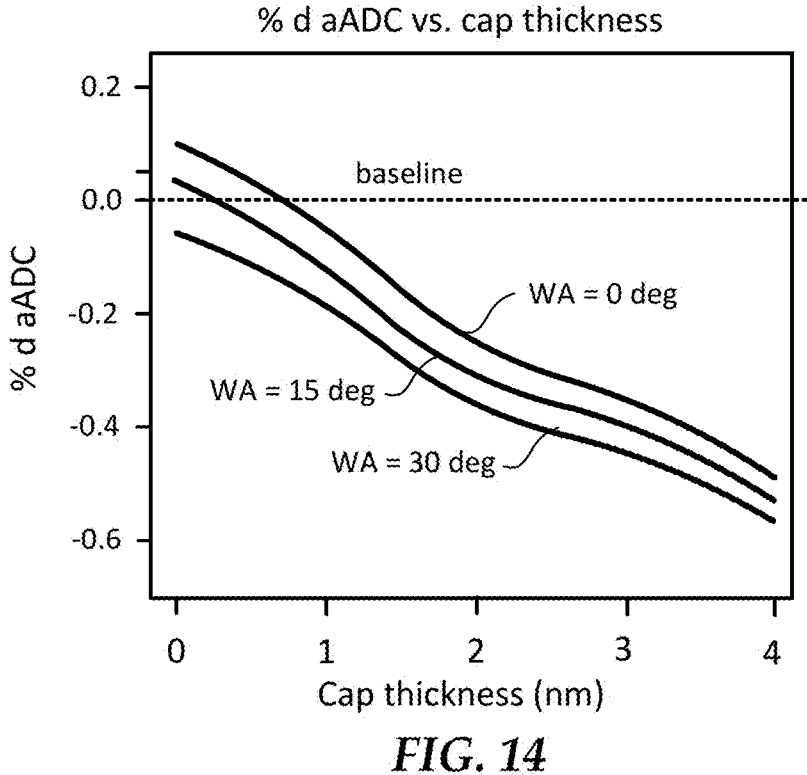
Figure 15:
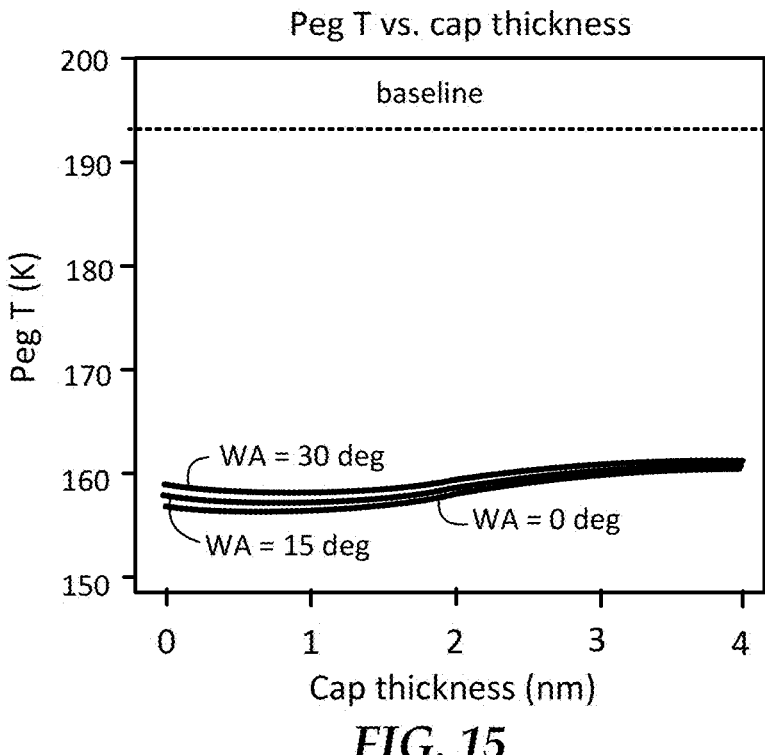

In FIG. 12 a graph show simulation results that demonstrate the effects of the middle disc dip on ADC for different values IBS, which is inverse to dimension of the inlay 410 in the z-direction. The graph in FIG. 13 shows peg temperature as a function of the middle disc dip. In FIGS. 14 and 15, graphs show simulation results that demonstrate the effects of the cap on ADC and peg temperature. In FIGS. 14 and 15, the results are shown for three different values of WA.

Additional analyses were performed to gauge the effects of geometry variations of ILR, IBS, and inlay_L. The results are summarized in Table 3 below. For each row, the lower and upper limit of the analyzed variable is given and accompanied by the corresponding range of the analyzed value, with an up or down arrow indicating the trend. For example, an increase in ILR from 10-80 nm results in a decrease in ADC and Inlay T, and an increase in CPI and Peg T. Most of the increases or decreases were fairly linear across the range except for Inlay_L, which showed a sharp change between 30-100 nm, and then a fairly linear response from 100-600 nm.

TABLE 3

| Variable | ADC | CPI (mW) | Peg T (K) | Inlay T(K) |
|---|---|---|---|---|
| ILR, 10-80 nm | ↓1.94-1.92 | ↑2.71-3.15 | ↑156-168 | ↓78-58 |
| IBS, 0-20 nm | ↓1.94-1.92 | ↑2.70-3.14 | ↑156-168 | ↑67-92 |
| Inlay_L, 30-600 nm | ↑1.926-1.932 | ↓2.95-2.80 | ↓166-159 | ↓82-71 |

Figure 16:
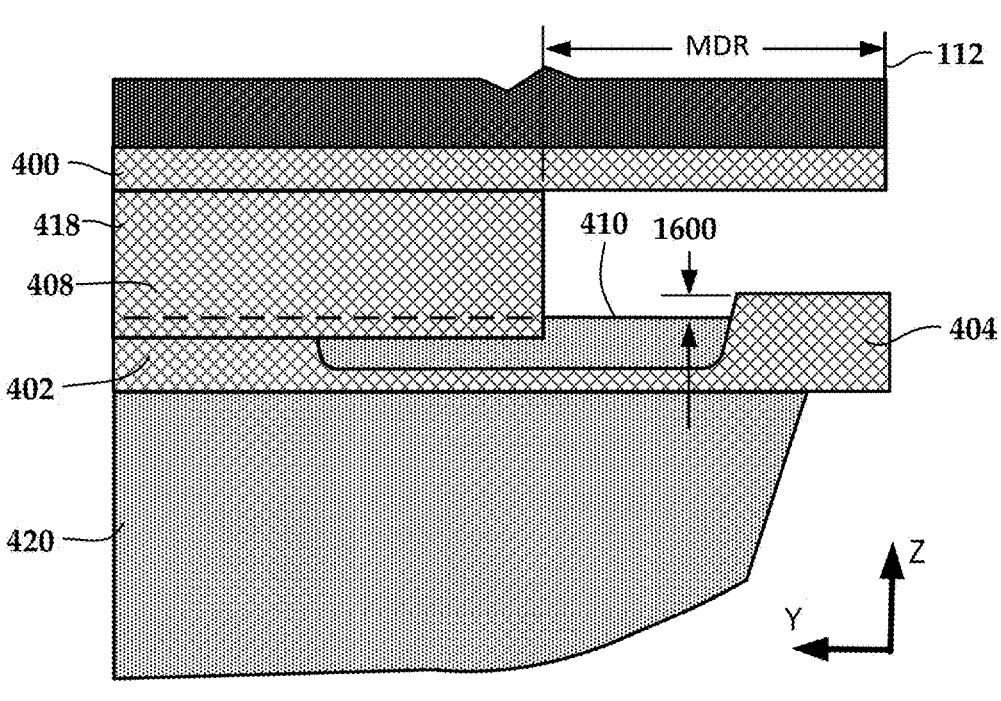
FIG. 16 is a side cutaway view showing details of a near-field transducer according to another embodiment.

In FIG. 16 a cross-sectional side view shows details of a near-field transducer according to other embodiments. In this example, there is no cap over the inlay 410, and the inlay is recessed below the coupling surface by an etch dimension 1600, which can be caused by manufacturing operations that are performed after the inlay is formed. Generally, a significant value of the etch dimension 1600 may be undesirable, therefore a cap 1100 as shown in FIG. 11 may be used, or subsequent processing steps may be selected to minimize this etch dimension 1600. The cap 1100 may impart a reduction in performance on the near-field transducer, but not as much as over-etching of the inlay 410.

In the previous examples, the inlay 410 is partially covered by the middle disc 418 proximate a media-facing end of the middle disc 418. For example, given the inlay length dimension inlay_L shown in FIG. 5, a portion of the inlay 410 measuring around 0.2*inlay_L to 0.8*inlay_L may be covered by the middle disc 418, leaving a respective 0.8*inlay_L to 0.2*inlay_L uncovered by the middle disc 418 and facing the peg coupler 400.

Figure 17A:
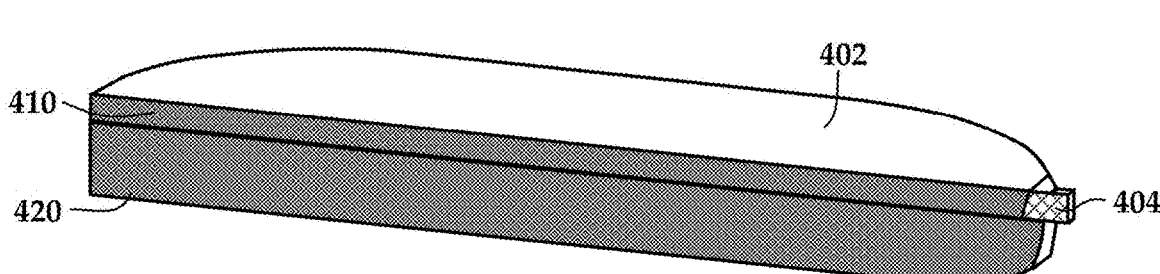
FIGS. 17A and 17B are a perspective cutaway views of near-field transducers according to other embodiments.
Figure 17B:
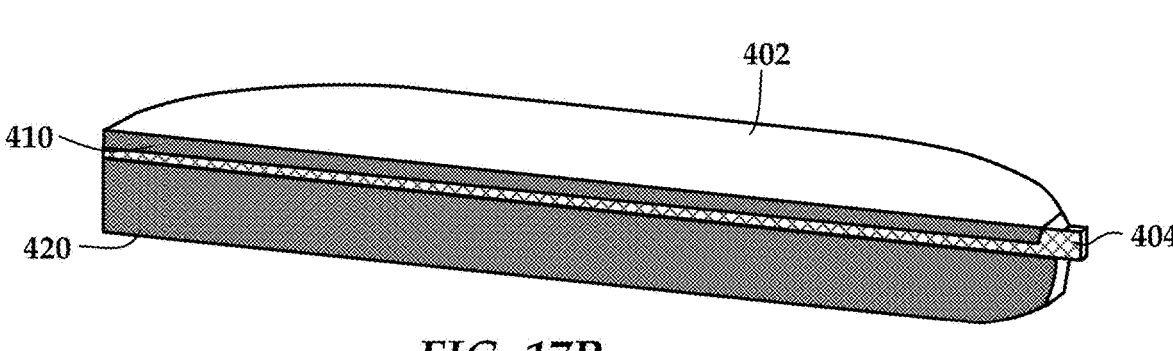

In the previous embodiments, the inlay 410 has a length inlay_L that is less than half that of the enlarged part 402, the length being defined normal to the media facing surface (along the Y-direction). The value of inlay_L may be much less than the length of the enlarged part, e.g., 5-20% of the enlarged part length. In other embodiments shown in FIGS. 17A and 17B, the inlay 410 can extend over nearly the entire length of the enlarged part 402, such that inlay_L is only slightly smaller (e.g., 90-99%) than the corresponding Y-direction-length of the enlarged part 402. In FIG. 17A, IBS=0, and in FIG. 17B, IBS>0. In the latter case, Ir or other second material is between the inlay 410 and the sunken disc 420 to prevent etching recession of the inlay.

In Tables 4 and 5, simulation results are shown for a particular NFT design with inlay, which has the following dimensions (see FIG. 5): ILR=20 nm; Inlay_D=15 nm; and Inlay_L=100 nm. This roughly corresponds to the proportions seen in FIGS. 4 and 5. Both the NFT with inlay and the baseline have the same peg dimensions—PT25 and PW20. The MDR value in the second column of Table 3 refers to middle disc recess (see FIG. 16).

TABLE 4

| Design | PCS/MDR (nm) | ADC gain | Peg T (K) | SDSC T(K) |
|---|---|---|---|---|
| Baseline | 25/55 | ref | 174 | 73 |
| With Inlay | 20/65 | 3% | 173 | 66 |

TABLE 5

| Design | Inlay T (K) | WPE (nm) | DTTG (K/nm) | CPI (mW) | Pabs (mW) |
|---|---|---|---|---|---|
| Baseline | — | 24.36 | 9.76 | ref | ref |
| With Inlay | 66 | 23.49 | 10.17 | −7.8% | −7.9% |

The "with inlay" design as shown in Tables 4 and 5 is predicted to have similar performance as the baseline. A significant drop in laser power and a slight increase in ADC predicts that this design will provide an improvement in coupling efficiency over the baseline.

Figure 18:
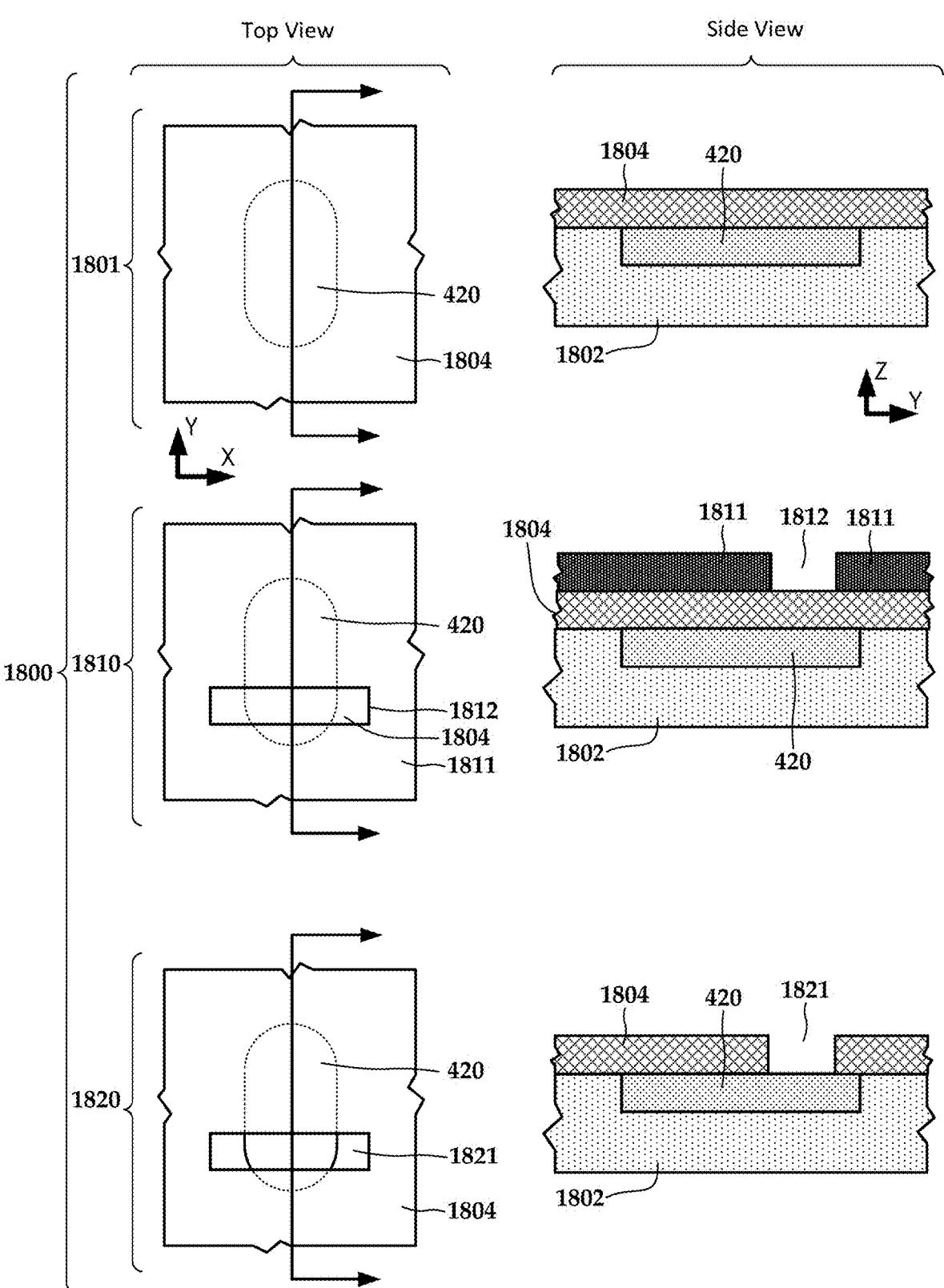
FIGS. 18-20 are diagrams showing manufacturing of a near-field transducer according to an example embodiment.
Figure 19:
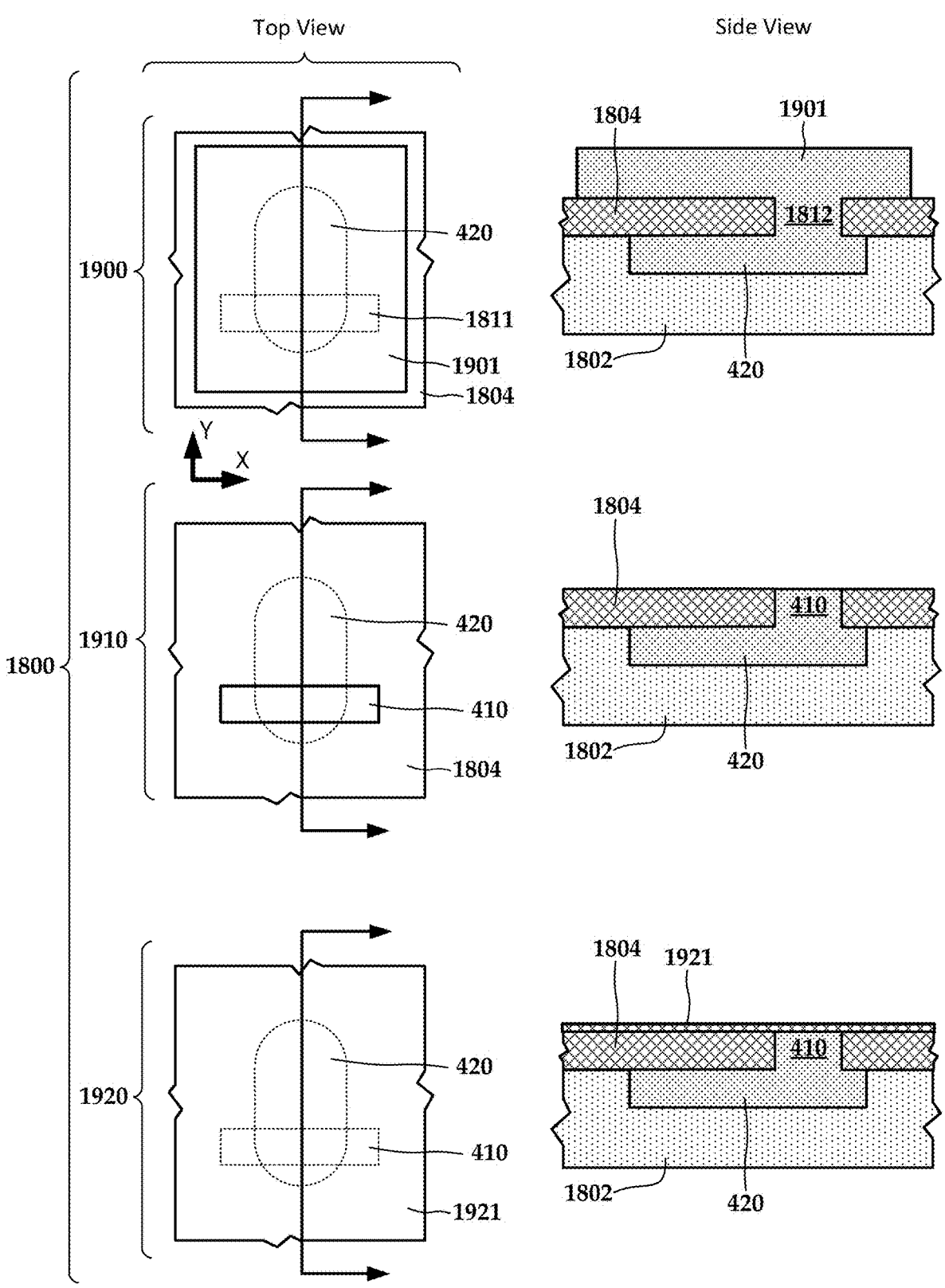
Figure 20:
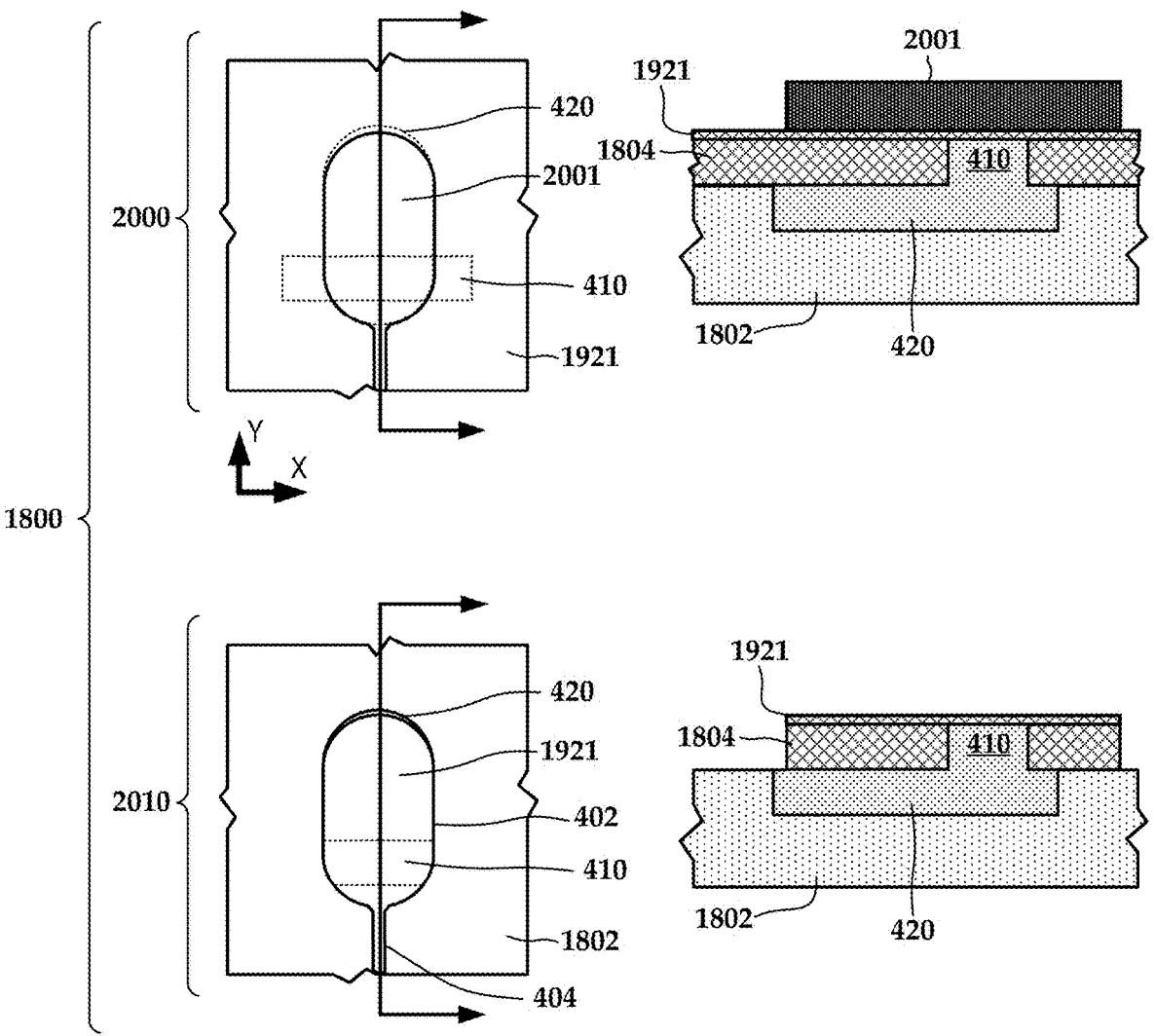

In FIGS. 18-20, diagrams illustrate a manufacturing process 1800 for a near-field transducer with inset according to an example embodiment. As indicated by the top legends, the left sides of the figures are top, wafer plane views (XY-plane) and the right sides of the figures are side, cross-sectional views (YZ-plane). At process step 1801, the sunken disc 420 has already been formed on a substrate 1802. The substrate 1802 may include an optical quality dielectric, and may include other, previously formed components such as a magnetoresistive reader and coupling waveguides.

The sunken disc 420 is formed of the first material, e.g., Au, and is coated with an NFT layer 1804 of the second material, e.g., Ir. The NFT layer 1804 will ultimately be shaped into the enlarged part (e.g., BDSC) and peg of the NFT. In process step 1810, a mask 1811 is patterned via photoresist to form a void 1812 in the shape of the inlay that exposes a section of the NFT layer 1804. This structure is subjected to a plasma etch, with a bottom anti-reflective coating (BARC) etch stop on the NFT layer 1804.

Process step 1820 shows the resulting structure after the etch has been performed, and after the resist and BARC have been washed away. The etching in this example leaves a trench 1821 that extends down to the sunken disc 420. In other embodiments, the etching may stop before the sunken disc 420 is reached (IBS>0). As seen in the left side of the figure, the trench 1821 extends beyond the edges of the sunken disc 420 in the cross-track direction (X-direction).

The inlay 410 is formed as shown in FIG. 19, which shows additional steps of the process 1800. In process step 1900, a layer 1901 of the first material is deposited to fill in the trench and cover the NFT layer 1804. The outer boundary of the layer 1901 is formed to cover an area that extends beyond that of the final NFT outline. This will protect the thickness of the first material of the NFT layer 1804. At process step 1910, a top part the layer 1901 is removed through chemical-mechanical planarization (CMP). The CMP stops at the NFT layer 1804, leaving the trench filled with the inlay 410.

At process step 1920, a cap layer 1921 is optionally deposited over the NFT layer 1804 and the inlay structure 410. The cap layer 1921 is formed of the same, second material as the NFT layer 1804. In other embodiments, no cap layer is formed, and a mask and chemical etch may be used to create a recession of the top surface of the inlay 410 as shown in FIG. 16, for example.

The process steps continue to FIG. 20, in which process step 2000 is shown. Process step 2000 involves depositing a mask 2001 that defines the outer shape of the enlarged part and peg. Note that in some embodiments the sunken disc 420 and bottom disc (enlarged part) may have a substantially same outer profile, but in this example, the bottom disc is slightly smaller than the sunken disc, as seen at the far end of the discs facing away from the peg. At process step 2010, the unmasked areas are etched away and the resist pattern has removed, leaving the final shape of the enlarged part 402 and peg 404.

The etching through both the NFT layer 1804 and inlay 410 ensures that the crosstrack edges of the inlay 410 conform to that of the enlarged part 402. This etch also exposes the inlay material at its cross track edges of the enlarged part 402. The remaining components (e.g., middle disc) can be formed on top of this structure. Note that the final dimensions of the peg 404 in the Y-direction will be set at a later stage, in which the media-facing surface is formed (e.g., via cleaving, CMP, etc.)

Unless otherwise indicated, all numbers expressing feature sizes, amounts, and physical properties used in the specification are to be understood as being modified in all instances by the term "about." Accordingly, unless indicated to the contrary, the numerical parameters set forth in the foregoing specification are approximations (e.g., ±10%) that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise. Generally such terms are used herein to describe an orientation shown in the figure, and unless otherwise specified, are not meant to limit orientation of physical embodiments, e.g., relative to the Earth's surface.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

What is claimed is:

1. A recording head, comprising:
a write pole having a pole tip extending to a media-facing surface of the recording head;
a peg coupler on a substrate-parallel surface of the pole tip and extending to the media-facing surface;
a near-field transducer proximate the media-facing surface, the near-field transducer comprising a plate-like, enlarged part with a peg extending from the enlarged part towards the media-facing surface, the peg separated in a downtrack direction from the peg coupler by a coupling gap, the enlarged part having a coupling surface facing the write pole, the enlarged part comprising an inlay on or near the coupling surface and spaced away from the peg, the inlay extending at least partially through a thickness of the enlarged part in the downtrack direction and extending between opposing crosstrack edges of the enlarged part, the inlay formed of a first material having higher optical coupling efficiency than a second material used to form the enlarged part; and
a cap layer of the second material covering the inlay and the coupling surface.

2. The recording head of claim 1, wherein the inlay extends fully through the thickness of the enlarged part.

3. The recording head of claim 1, wherein the first material of the inlay is exposed at the coupling surface.

4. The recording head of claim 1, wherein the first material comprises Au and the second material comprises Ir.

5. The recording head of claim 1, further comprising a middle disc disposed between the enlarged part and the peg coupler.

6. The recording head of claim 5, wherein the middle disc partially covers the inlay.

7. The recording head of claim 5, wherein the middle disc is formed of the second material.

8. The recording head of claim 1, further comprising a sunken disc on a surface of the enlarged part facing away from the coupling surface, the sunken disc formed of the first material.

9. The recording head of claim 1, wherein the inlay has exposed crosstrack edges that are conformal with the respective opposing crosstrack edges of the enlarged part.

10. The recording head of claim 1, wherein the inlay has a length that is less than half that of the enlarged part, the length being defined normal to the media-facing surface.

11. The recording head of claim 1, wherein media-facing-surface parallel edges of the inlay have a non-zero wall angle relative to the media-facing surface.

12. A recording head, comprising:
a write pole having a pole tip extending to a media-facing surface of the recording head;
a peg coupler on a substrate-parallel surface of the pole tip and extending to the media-facing surface;
a near-field transducer proximate the media-facing surface, the near-field transducer comprising a plate-like, enlarged part with a peg extending from the enlarged part towards the media-facing surface, the peg separated in a downtrack direction from the peg coupler by a coupling gap, the enlarged part having a coupling surface facing the write pole, the enlarged part comprising an inlay on or near the coupling surface and spaced away from the peg, the inlay formed of a first material different than a second material of the enlarged part, the inlay extending at least partially through a thickness of the enlarged part in the downtrack direction and extending between opposing crosstrack edges of the enlarged part;
a cap layer of the second material covering the inlay and the coupling surface; and
a middle disc disposed between the enlarged part and the peg coupler, the middle disc partially covering the inlay.

13. The recording head of claim 12, wherein the middle disc is formed of the second material.

14. The recording head of claim 12, wherein the inlay has exposed crosstrack edges that are conformal with the respective opposing crosstrack edges of the enlarged part.

15. The recording head of claim 12, wherein media-facing-surface parallel edges of the inlay have a non-zero wall angle relative to the media-facing surface.

16. The recording head of claim 12, wherein the first material comprises Au and the second material comprises Ir.

* * * * *